United States Patent [19]
Moulton et al.

[11] 3,820,813
[45] June 28, 1974

[54] VEHICLE REAR WHEEL SUSPENSION ARRANGEMENT

[75] Inventors: Alexander Eric Moulton; Anthony Best, both of Bradford-on-Avon, England

[73] Assignee: Moultan Developments Limited, Wiltshire, England

[22] Filed: Dec. 15, 1972

[21] Appl. No.: 315,578

[52] U.S. Cl. .............................. 280/124 A, 267/57
[51] Int. Cl. ............................................. B60g 3/12
[58] Field of Search ......... 280/124 R, 124 F, 124 B; 267/57, 57.1 A, 63, 136, 154, 153

[56] References Cited
UNITED STATES PATENTS

| | | | |
|---|---|---|---|
| 2,641,464 | 6/1953 | Linn | 280/124 R |
| 3,120,952 | 2/1964 | Hendrickson | 280/124 R |
| 3,201,142 | 8/1965 | Dangauthier | 280/124 A |
| 3,704,029 | 11/1972 | Bailleux | 280/124 R |
| 3,737,174 | 6/1973 | Hickman | 280/124 B |

*Primary Examiner*—Philip Goodman
*Assistant Examiner*—John A. Carroll
*Attorney, Agent, or Firm*—Shoemaker and Mattare

[57] ABSTRACT

The invention relates to a rear wheel suspension system for a four wheeled automotive vehicle and provides an integrated sub-assembly which can be simply fitted in its entirety to the vehicle at a late stage of manufacture. The assembly includes hydraulic displacer units acting at high leverage on trailing type wheel supporting arms, the arrangement being such that the high loading generated by the displacers are largely absorbed within the sub-assembly. Means are provided for both locating the wheels and allowing a controlled degree of flexibility in such location. Means are also provided for insulating the suspension system from the sprung structure or body of the vehicle.

4 Claims, 3 Drawing Figures

VEHICLE REAR WHEEL SUSPENSION ARRANGEMENT

This invention relates to an independent rear wheel suspension system for a four-wheeled automotive vehicle and in particular to the type in which the sprung structure is supported on a liquid under pressure by inter alia hydraulic displacer units.

Hydraulic displacer units are well-known in the art and, described briefly, comprise a piston member and a housing constituting a cylinder, with the piston and cylinder being hermetically sealed and bridged by a flexible diaphragm. The diaphragm is acted upon directly by a liquid under pressure and the housing is appropriately located, often with intervening resilient bushes, relative to the sprung structure of the vehicle, while the piston is arranged to move with a road wheel of the vehicle by acting on a supporting arm for that wheel.

Rear suspension systems are well-known in which each wheel is carried at the rear end of a trailing or semi-trailing arm which is supported at its leading end for pivotal movement about an axis extending generally transversely of the vehicle. An hydraulic displacer unit is arranged to control the pivotal movement of the suspension arm.

Examples of such suspension systems have been described in prior British Patent specifications Numbers 1,096,207; 1,151,391; and 1,231,282.

In these and other similar examples where an hydraulic displacer unit acts on a suspension arm at a relatively high leverage, which may range between 1 : 3 and 1 : 6, it is advantageous for the displacer units to be mounted to act more or less horizontally so that the penetration of passenger space is minimal. However, the consequential high loadings generated by the high leverage necessitates low friction bearings of high radial stiffness. The wheel supporting arm requires adequate location to prevent unwanted steering consequences, while at the same time the arm requires to be resiliently mounted to provide two distinct types of controlled movement.

Of the two types of movement required in such suspension systems, the first of these we term in this Specification "pivotal movement" and the second we term "compliance movement."

By "pivotal movement" we mean the partial rotation which the wheel supporting arm performs about the mounting at its leading end, this occurring as the associated wheel rises or falls relative to the vehicle sprung structure. By "compliance movement," we mean movement of the wheel supporting arm such that the axis of the aforementioned pivotal movement is itself displaced. When this occurs, the associated wheel may move fore and aft longitudinally, relative to the vehicle sprung structure or transversely thereof, or any combination of these. The amplitude of the deflections in compliance movement of a suspension arm are much smaller than those in pivotal movements.

This invention has for its object to provide a vehicle rear suspension system which satisfies in large measure the following different and often conflicting criteria:

i.
The loadings fed into the sprung structure of the vehicle are of a low order;

ii.
a controlled degree of pivotal and compliance movement is allowed to each arm while at the same time the arm is located to reduce or eliminate unwanted rear wheel steering consequences;

iii.
the rear wheel suspension assembly is adequately insulated from the vehicle sprung structure, both as regards noise and vibration;

iv.
the entire rear suspension system should as nearly as possible be capable of manufacture as a self-contained sub-assembly which can easily be mounted in the vehicle at a late stage of the latter's manufacture;

v.
the rear suspension system should intrude as little as possible into the passenger and luggage space of the vehicle.

To this end the invention provides vehicle rear wheel suspension system comprising in combination a.
a torsionally rigid substantially non-deformable metal structural member extending transversely of the vehicle;

b.
there being towards each end of said metal structural member a pair of rearwardly extending substantially non-deformable lugs, the outermost lug at each end of the structural member being connected to the vehicle sprung structure by rubber bonded-to-metal sandwich springs;

c.
A metal shaft extending between each respective pair of lugs;

d.
an hydraulic displacer unit having its housing secured by a rigid casing member to a central region of each shaft;

e.
wheel supporting arm extending rearwardly from the shaft to mount, at its rear end, a rear wheel of the vehicle;

f.
the leading end of the wheel supporting arm being constituted as a sleeve surrounding said shaft in regions on both sides of the central region in the shaft where it is connected to the casing to which the displacer unit is in turn secured.

g.
a pair of rubber-bonded-to metal torsion bushes arranged on said shaft one on each side of the said central region and each having a cylindrical inner metal shell surrounding the shaft and prevented from rotation relative to the casing and an outer metal shell secured to and within the sleeve constituted at the leading end of the wheel supporting arm;

h.
and said hydraulic displacer unit being arranged to act on the wheel supporting arm through the medium of a depending crank rigidly attached to the sleeve at the leading end of the arm;

i.
and wherein a rubber spring pad is detachably secured to the vehicle sprung structure and is arranged between the sprung structure and the housing of the displacer unit at a radius from said shaft, similar to the swinging radius afforded to the road wheel with which it is associated.

Preferably the resilient torsion bushes arranged on each shaft comprise the aforementioned inner and outer metal shells and inner and outer concentric cylindrical bodies of rubber each bonded to a third interposed metal shell.

The two cylindrical bodies of rubber share all loadings whether axial, torsional or radial and the pair of torsion bushes provided for each suspension arm firstly afford both pivotal movement and location to the arm since their resistance is high in the radial and axial directions.

Secondly, the bushes absorb the high radial loadings generated by the hydraulic displacer unit.

Thirdly, these bushes, although allowing pivotal movement to the suspension arm, can be arranged to impose a significant spring rate in the suspension of the associated wheel since pivotal movement of the suspension arm generates torsional deflection in each bush. This latter feature is particularly important in vehicle suspension systems where the front and rear wheel suspensions are rendered conjugate hydraulically since these bushes contribute significantly to the stiffness in pitch afforded by the suspension.

Controlled compliance movement is afforded by sandwich springs interposed between the sprung structure and the outermost lugs at the opposite ends of the transverse structural member, and these springs together with the torsional bushes give a high degree of insulation between the wheel supporting arm and the vehicle sprung structure.

One embodiment of the invention will be described by way of example with reference to the accompanying drawings in which FIG. 1 is a plan view partially in cross section of the resilient suspension system associated with one rear wheel of a four-wheeled automotive vehicle;

Figure 1:
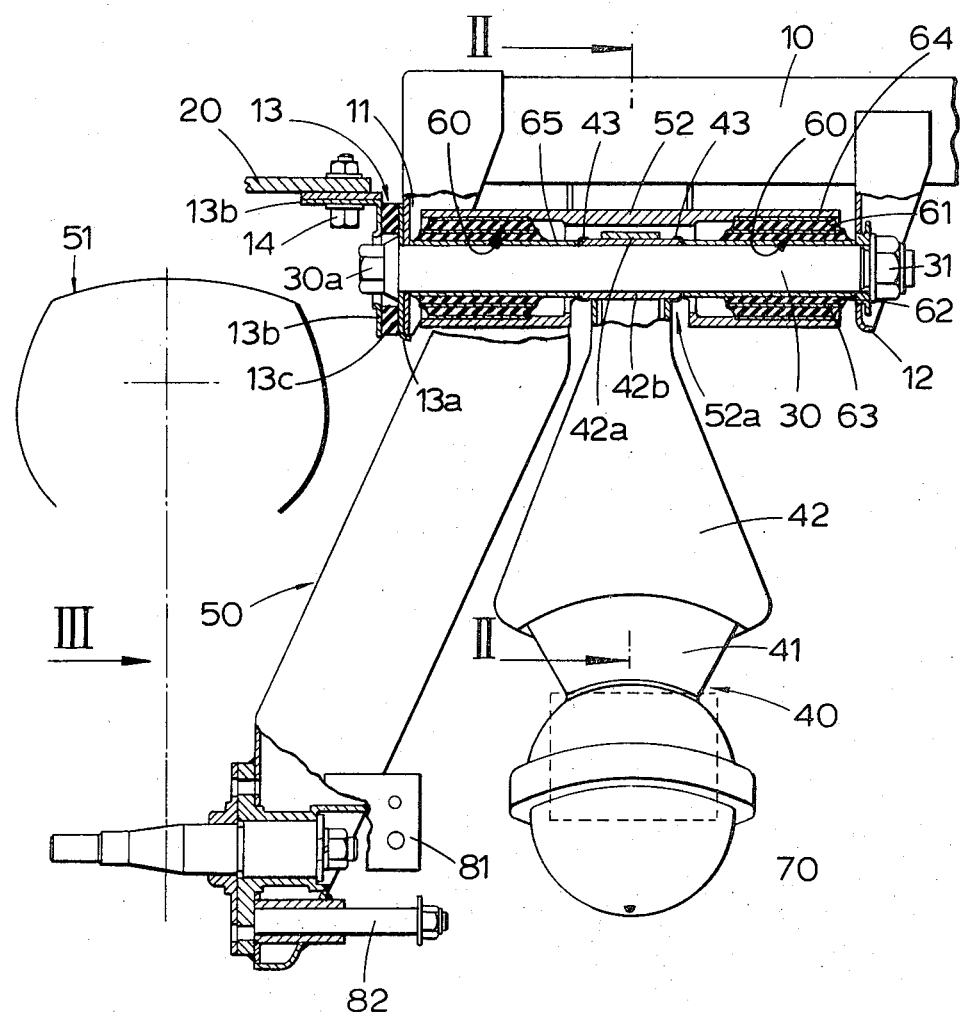

The vehicle rear suspension system illustrated in the drawings includes a torsionally rigid substantially non-deformable metal structural member 10 which is adapted to extend transversely across the vehicle from one side to the other. In the embodiment illustrated, the structural member 10 is constituted by a metal tube.

The structural member 10 is demountably connected to the vehicle sprung structure at each of its opposite ends. For this purpose at each of its ends the structural member 10 is provided with a rearwardly extending non-deformable lug 11 and to this lug 11 is secured a plate member 13a of a rubber-bonded-to-metal sandwich spring generally designated 13. This comprises a body of rubber 13c bonded between metal plates 13a and 13b. The plate 13b is attached to the vehicle sprung structure generally designated at 20 in FIG. 1 by bolt means 14.

Inwardly of the lug 11 at each of its ends the structural member 10 has a second rearwardly extending non-deformable lug 12. The pair of lugs 11 and 12 at each end of the structural member 10 are each apertured.

FIG. 1 shows only one end of the structural member 10 and the wheel suspension assembly associated with the left hand rear wheel and it will be understood that the wheel suspension assembly associated with the right hand rear wheel on the opposite side of the vehicle will be identical to that shown in FIG. 1.

Between the apertured pair of lugs 11 and 12 there extends a metal shaft 30.

A diaphragm type hydraulic displacer unit generally designated 40 has its housing 41 secured to a rigid casing member 42. This casing member 42 extends forwardly from the displacer unit 40 and as will be seen from FIGS. 1 and 2 has at its leading end a circular part 42a in which is fixed a sleeve element 42b. The sleeve element 42b is free on shaft 30 and is located in a central region longitudinally of the shaft 30.

50 generally represents a wheel supporting arm extending rearwardly from the shaft to mount at its rear end a rear wheel 51 of the vehicle.

At its leading end the wheel supporting arm is constituted as a sleeve 52 and the sleeve 52 is arranged to surround the shaft 30 in regions on both sides of the central region of the shaft 30 where there is located the sleeve 42b connected to the casing member 42.

The sleeve 52 is of generally cylindrical shape, except that a window is provided at 52a to accommodate the leading end of the casing member 42.

A pair of rubber-bonded-to-metal torsion bushes generally designated 60 are arranged on the shaft 30 on each side of its central region and each bush comprises an inner and an outer concentric cylindrical body of rubber 61 and 62 respectively. The rubber cylindrical bodies 61 and 62 are each bonded to an intermediate cylindrical metal shell 63. The outer cylindrical body of rubber 61 is bonded to the outer shell 64 which is secured against rotation relative to the sleeve 52 at the leading end of the trailing arm 50.

The inner cylindrical body of rubber 62 is bonded to an inner cylindrical metal shell 65 which fits and is free to rotate on and about the shaft 30. The arrangement is such that when a nut 31 on shaft 30 (which latter has an hexagonal head 30a) is tightened the inner shells 65 of the rubber-bonded-to metal torsion bushes 60 are held rigid with the sleeve 42a at the leading end of casing member 42, in such manner that these shells 65 and the sleeve 42b cannot rotate relative to one another.

In order to promote locking of the inner shells 65 of the torsion bushes 60 against the casing member sleeve 42b serrated washer means 43 are advantageously provided.

It will here be mentioned that pivotal movement of the trailing arm 50 relative to the casing 42 about the shaft 30, will result in torsional deformation of the torsion bushes 60 with the inner and outer rubber cylindrical bodies 61 and 62 sharing such torsional deflection.

Figure 2:
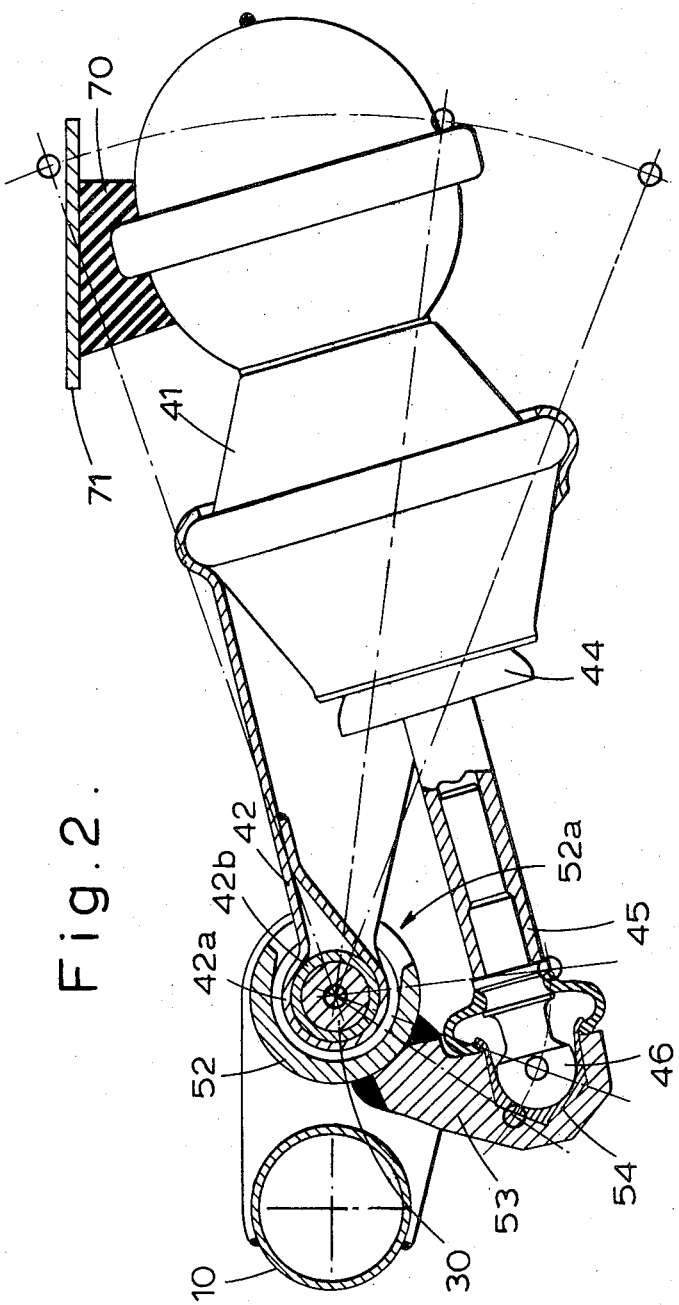
FIG. 2 is a side view taken partially in cross section on the lines indicated at II — II in FIG. 1.

The hydraulic displacer unit 40 has a piston element 44 FIG. 2 at which in known manner is provided with a flexible diaphragm hermetically sealing and bridging the piston with the housing 41 of the hydraulic displacer unit and a fluid under pressure is arranged to act on the diaphragm.

The piston 44 acts on the wheel suspension arm 50 through the medium of a crank 53 dependent from the sleeve 52 at the leading end of the arm 50. 45 represents a strut connected to the piston 44 and 46 is a ball-joint at the end of the strut 45 engaging in a socket 54 formed in the dependent crank 53.

Figure 3:
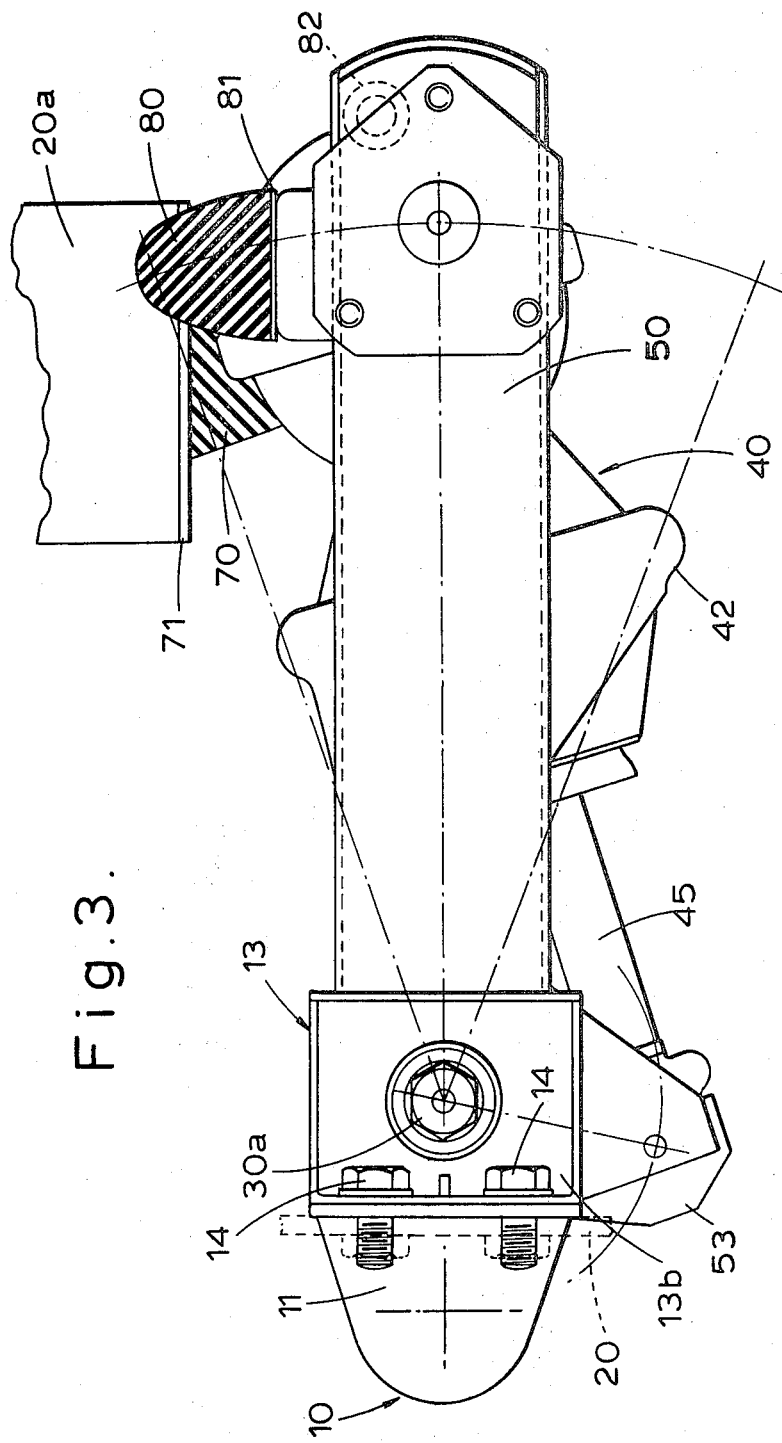
FIG. 3 is a further side view taken in the direction of the arrow III in FIG. 1.

70 represents a rubber spring pad arranged to act between the housing 41 of the displacer unit and a plate 71 which is detachably secured to the sprung structure of the vehicle indicated at 20a in FIG. 3. The pad 70 is arranged at a radius from the shaft 30 which is nearly the same as the swinging radius afforded to the roar wheel 51 by the suspension arm 50.

It will be seen that by this arrangement, vertical loadings from the suspensions associated with the respective rear wheels of the vehicle sprung structure are distributed firstly between the pair of rubber-to-metal bonded sandwich springs 13 at the respective ends of the structural member 10, secondly between the two displacer units 40, thirdly, between the pair of rubber pads 70 associated with the displacer units 40 at the respective sides of the vehicle and fourthly between the sandwich springs 13 at the opposite ends of the structural member 10.

However, the distribution of the loadings to the sprung structure will be very low as transmitted by the sandwich springs 13, and the upward forces transmitted to the sprung structure of the vehicle through each pad 70 will be substantially equal to the upward forces generated at the wheel associated with that pad.

The rubber torsion bushes 60 have an axial rate which is significantly higher than their torsional stiffness and a radial rate which is very significantly higher still.

These rubber bushes 60 afford for each suspension arm firstly, both pivotal movement and location. Secondly, the bushes absorb the high radial loadings generated by the hydraulic displacer unit 40. Thirdly these bushes, although they allow pivotal movement of the suspension arm, impose a significant spring rate to the suspension since pivotal movement of the suspension arm generates torsional deflection in each bush.

This latter feature is particularly important in vehicle suspension systems where the front and rear wheel suspensions at the respective sides of the vehicle are rendered conjugate hydraulically, since these bushes can be arranged to contribute significantly to the stiffness in pitch afforded by the suspension system to the vehicle as a whole.

For example, the bushes 60 could be arranged to be pre-loaded in torsion so that for a given spacing between the associated rear wheel and the sprung structure, the bushes are wound, while when load is added to the rear of the vehicle and, as a consequence, the spacing between the wheel and the sprung structure is reduced, so the bushes become progressively unwound.

Compliance movement to each individual rear wheel is afforded by the sandwich springs 13 at the opposite ends of the transverse structural member 10 and these sandwich spring together with the torsional bushes 60 and the spring pads 70 give a high degree of insulation between the wheel supporting arms of the vehicle rear wheels and the vehicle sprung structure.

It will be clear from a study of the drawings that the suspension system associated with two rear wheels of a vehicle as now proposed, is eminently suitable for manufacture as a complete sub-assembly which can be mated with the remainder of the vehicle during a late stage in its manufacture.

Thus uniting of the rear suspension sub-assembly, as illustrated in the drawings, with a vehicle sprung structure will merely involve affixing the two plates 13b at each side by the two bolts 14 to the sprung structure 20, and by affixing the plates 71 of the pads 70, to the sprung structure 20a as indicated in FIG. 3.

In cases where it is desired to afford the rear suspension with a levelling system to compensate for changes of vehicle loading, this can be suitably accomplished by rendering the strut 45 which extends between the displacer piston 44 and the dependent crank 53 extensible, for example the strut can be constructed as a telescopic assembly which is extensilbe hydraulically. Alternatively, a jacking system may be provided for varying the spacing between the displacer unit 40 and the sprung structure at 20a.

In FIG. 3, 80 represents a bump stop carried on a plate 81 which will be seen in FIG. 1 and such bump stop 80 will co-operate with a suitable abutment (not shown) appropriately located on the vehicle sprung structure.

Moreover, 82 indicates an anchorage pin to which can be attached a strap for limiting the distance which the wheel can move downwardly relative to the sprung structure.

We claim:

1. A vehicle rear wheel suspension system, comprising:
   a. a torsionally rigid, substantially non-deformable metal structural member secured to the vehicle and extending transversely thereof;
   b. a pair of rearwardly extending rigid lugs fixed to each end of the structural member;
   c. a metal shaft extending between each respective pair of lugs substantially parallel to the structural member and secured at its opposite ends to the lugs;
   d. a hydraulic, shock absorbing displacer unit connected to each shaft and each displacer unit including a housing, a rigid casing member secured to the housing of each displacer unit and having a portion thereof disposed in surrounding relation to a central region of each shaft to connect the displacer units to a respective shaft;
   e. a wheel supporting arm connected to each shaft, said arms each having a transverse sleeve fixed to one end thereof and means at the other end thereof to mount a rear wheel of a vehicle, said sleeves disposed in surrounding relationship to a respective shaft at both sides of the central region of the shaft to pivotally mount the wheel supporting arms to the shafts with the arms extending rearwardly from the shafts;
   f. a pair of resilient, rubber-bonded-to-metal torsion bushes arranged on the shaft on opposite sides of the central region thereof and between the sleeve and shaft and fixedly connected at the outer surface to the sleeve and fixedly connected at the inner surface to the casing so that the wheel supporting arms are connected to the casings and thus the hydraulic displacer units via the bushes, whereby a controlled degree of pivotal movement is afforded for each arm and axial, torsional and radial loadings are absorbed;
   g. a crank rigidly attached at one end thereof to the sleeve of each arm and extending radially therefrom at the other end thereof;
   h. each said hydraulic displacer unit connected at one end thereof with the said other end of a respective crank and connected at the other end with the vehicle sprung structure, whereby the leverage imposed from said arm through said sleeve and crank to said displacer unit imposes a substantial static load on the suspension system;

i. a rubber spring pad detachably secured to the vehicle sprung structure between the other end of the displacer unit and the sprung structure at a radius from the shaft similar to the swinging radius of a wheel carried by the arm; and j. a rubber-bonded-to-metal sandwich spring secured to the outer lug of each pair of lugs and to the vehicle sprung structure to attach the system to the vehicle and to provide a controlled degree of compliance movement of the arms.

2. A vehicle suspension system according to claim 1 wherein the resilient torsion bushes arranged on each shaft each comprise inner and outer concentric cylindrical bodies of rubber each bonded to an intermediate metal shell, the outer rubber body having its outer periphery bonded to an outer metal shell, and the inner rubber body having its inner periphery bonded to an inner metal shell surrounding the shaft.

3. A rear wheel suspension system according to claim 1 in which the transverse structural member, the pair of shafts, the respective wheel supporting arms pivotally connected to the shafts and the respective displacer units connected to the shafts, form together an integrated, self-standing sub-assembly, which is attached to the vehicle sprung structure as a unit via the sandwich springs associated with the outer lug at each end of the structural member and the rubber spring pads connected between the two displacer units and the vehicle sprung structure at each respective side of the vehicle, these four springs comprising the sole connection between the sub assembly and the sprung structure, so that there is no metal to metal connection between the sub-assembly and the vehicle sprung structure.

4. A suspension system, according to claim 3 wherein the sandwich springs each comprise a body of rubber bonded between two metal plates.

* * * * *